United States Patent
Herbeck et al.

(10) Patent No.: US 9,367,081 B2
(45) Date of Patent: Jun. 14, 2016

(54) METHOD FOR SYNCHRONIZING INDEPENDENT CLOCK SIGNALS

(71) Applicant: Apple Inc., Cupertino, CA (US)

(72) Inventors: Gilbert H. Herbeck, Livermore, CA (US); Shane J. Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 14/489,380

(22) Filed: Sep. 17, 2014

(65) Prior Publication Data

US 2016/0077546 A1 Mar. 17, 2016

(51) Int. Cl.
*H03L 7/00* (2006.01)
*G06F 1/12* (2006.01)

(52) U.S. Cl.
CPC ........................................ *G06F 1/12* (2013.01)

(58) Field of Classification Search
CPC ............................................................ G06F 1/12
See application file for complete search history.

(56) References Cited

U.S. PATENT DOCUMENTS

| 5,274,678 | A | 12/1993 | Ferolito et al. |
| 5,675,615 | A | 10/1997 | Watt |
| 6,107,841 | A | 8/2000 | Goodnow |
| 7,039,146 | B2 * | 5/2006 | Chiu ........................ G06F 1/08 375/354 |
| 7,071,738 | B1 | 7/2006 | Nguyen et al. |

* cited by examiner

*Primary Examiner* — Daniel Puentes
(74) *Attorney, Agent, or Firm* — Meyertons, Hood, Kivlin, Kowert & Goetzel, P.C.

(57) ABSTRACT

An apparatus for synchronizing two clock signals is disclosed. The apparatus may include a selection unit and circuitry. The selection unit may be configured to select a first or second clock signal as an output clock signal. A frequency of the first clock signal may be less than a frequency of the second clock signal. The circuitry may be configured to send a first signal to the selection unit, causing the selection unit to select the first clock signal. The circuitry may also be configured to send a second signal to the selection unit, causing the selection unit to select a subset of clock pulses of the second clock signal as the output clock signal. The subset of clock pulses of the second clock signal may include a clock pulse of the second clock signal corresponding to a transition of the first clock signal.

17 Claims, 8 Drawing Sheets

METHOD FOR SYNCHRONIZING INDEPENDENT CLOCK SIGNALS

BACKGROUND

1. Technical Field

Embodiments described herein are related to the field of integrated circuit implementation, and more particularly to the implementation of clock synchronization circuits.

2. Description of the Related Art

Computing systems may include one or more systems-on-a-chip (SoCs), which may integrate a number of different functions, such as, application execution, graphics processing and audio processing, onto a single integrated circuit. With numerous functions included in a single integrated circuit, chip count may be kept low in mobile computing systems, such as tablets, for example, which may result in reduced assembly costs, and a smaller form factor for such mobile computing systems.

System-on-a-chip (SoC) designs may have multiple clock sources, each operating at a different frequency to support one or more functions. A given functional block within an SoC, such as, for example, an Universal Serial Bus (USB) module, a real-time clock, a graphics processor, or an audio processor, may utilize two or more clock signals with different frequencies (a first, lower frequency clock and a second, higher frequency clock, for example) for proper operation. In such cases, a first portion of the functional block may require the first clock for at least some time periods while a second portion of the functional block may require the second clock during a same time period. A current method for providing both clocks to the functional block may be to couple both clocks to the functional block. Such a solution, however, may require clock synchronization circuits within the functional block to synchronize clock signals traversing between the first and second portions of the functional block.

SUMMARY OF THE EMBODIMENTS

Various embodiments of a synchronizing circuit are disclosed. Broadly speaking, a system, an apparatus, and a method are contemplated in which the apparatus includes a selection unit and circuitry. The selection unit may be configured to select a first or second clock signal as an output clock signal. A frequency of the first clock signal may be less than a frequency of the second clock signal. The circuitry may be configured to send a first signal to the selection unit, causing the selection unit to select the first clock signal. The circuitry may also be configured to send a second signal to the selection unit, causing the selection unit to select a subset of clock pulses of the second clock signal as the output clock signal. The subset of clock pulses of the second clock signal may include a given clock pulse of the second clock signal wherein a transition of the given clock pulse may correspond to a given transition of the first clock signal.

In a further embodiment, the subset of clock pulses of the second clock signal may include a plurality of clock pulses of the second clock signal occurring between a first transition of the first clock signal and a subsequent transition of the first clock signal. In another embodiment, the transition of the given clock pulse of the second clock signal may correspond to a low-to-high transition of the first clock signal.

In one embodiment, the circuitry may be further configured to assert a clock valid signal responsive to a determination the given clock pulse has begun, and to de-assert the clock valid signal responsive to a determination the given clock pulse has ended. In a further embodiment, the circuitry may be further configured to assert a clock enable signal, wherein the subset of clock pulses may include the plurality of clock pulses of the second clock signal responsive to a determination that the clock enable signal is asserted.

In another embodiment, a first logic circuit may be included. The first logic circuit may be configured to perform a first operation dependent upon a given transition of the output clock signal responsive to determining the clock valid signal is asserted during the given transition of the output clock signal. In a further embodiment, a second logic circuit may be included. The second logic circuit may be configured to perform a second operation responsive to a transition of the output clock signal while the clock valid signal is de-asserted.

BRIEF DESCRIPTION OF THE DRAWINGS

The following detailed description makes reference to the accompanying drawings, which are now briefly described.

Figure 1:
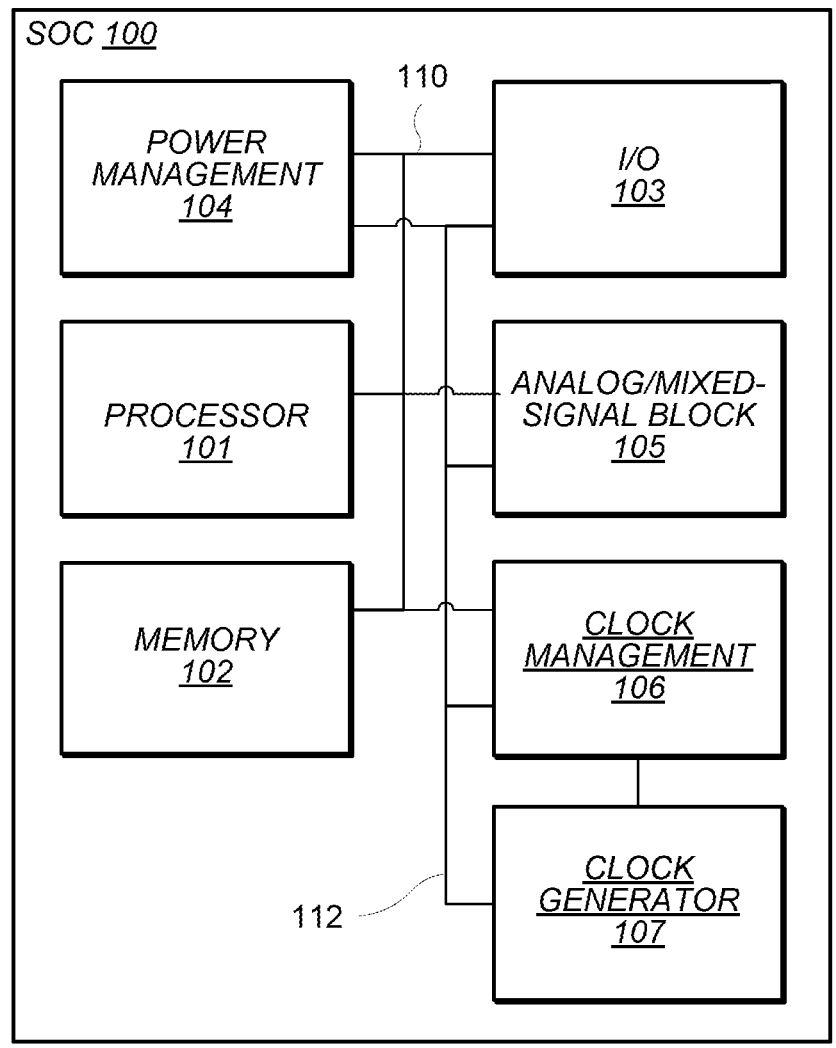
FIG. 1 illustrates an embodiment of a system-on-a-chip (SoC).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

A system on a chip (SoC) may include one or more functional blocks, such as, e.g., a processor and one or more memories, which may integrate the function of a computing system onto a single integrated circuit. In some SoC designs, multiple clock signals may be included as required to support various features of the SoC. Each clock signal may operate at a different frequency to support one or more functions. A given functional block within an SoC may require two or more clock signals for proper operation.

When multiple clock sources are utilized, common signals may be needed by circuits clocked by a first clock, i.e., a first clock domain, and circuits clocked by a second clock, i.e., a second clock domain. If the first and second clocks run asynchronously, then a signal traveling from the first clock domain to the second clock domain may transition asynchronously to the second clock. The signal crossing clock domains may be synchronized to the second clock domain, through the use of a synchronization circuit. The synchronization circuit may receive the asynchronous signal as an input and adjust the timing of transitions to generate a synchronized version of the signal that meets the timing requirements of the second clock domain. Synchronization circuits, however, may consume die area and power, particularly if used in more than one functional block. Even if used in a single functional block, the process of synchronizing two clock signals, particularly if one clock signal is much slower than the second clock signal, may create latency to circuits in one or both clock domains. Also, routing two clock signals from their clock sources to the functional block or blocks that require the clock signals may consume die area and power that may otherwise be saved. In addition, having two clock signals propagate around an SoC may increase a level of switching noise in the SoC when compared to a single clock signal.

The embodiments illustrated in the drawings and described below may provide a solution in which two independent clock sources may be provided to a functional block as a single clock signal. These embodiments may also provide techniques that may reduce latency within clock domains of one or both clock sources, and may reduce switching noise and power consumption from unnecessary clock propagation in an SoC.

Many terms commonly used in reference to SoC designs are used in this disclosure. For the sake of clarity, the intended definitions of some of these terms, unless stated otherwise, are as follows.

A Metal-Oxide-Semiconductor Field-Effect Transistor (MOSFET) describes a type of transistor that may be used in modern digital logic designs. MOSFETs are designed as one of two basic types, n-channel and p-channel. Complementary MOSFET (CMOS) describes a circuit designed with a mix of n-channel and p-channel MOSFETs. In CMOS designs, n-channel and p-channel MOSFETs may be arranged such that a high level on the gate of a MOSFET turns an n-channel transistor on, i.e., opens a conductive path, and turns a p-channel MOSFET off, i.e., closes a conductive path. Conversely, a low level on the gate of a MOSFET turns a p-channel on and an n-channel off. While CMOS logic is used in the examples described herein, it is noted that any suitable logic process may be used for the circuits described in embodiments described herein.

It is noted that "logic 1", "high", "high state", or "high level" refers to a voltage sufficiently large to turn on a n-channel MOSFET and turn off a p-channel MOSFET, while "logic 0", "low", "low state", or "low level" refers to a voltage that is sufficiently small enough to do the opposite. In other embodiments, different technology may result in different voltage levels for "low" and "high."

System-on-a-Chip Overview

A block diagram of an embodiment of an SoC is illustrated in FIG. 1. In the illustrated embodiment, the SoC 100 includes a processor 101 coupled to memory block 102, I/O block 103, power management unit 104, analog/mixed-signal block 105, clock management unit 106, all coupled through bus 110. Additionally, clock generator 107 may be coupled to clock management unit 106 and provide a clock signal 112 to some blocks in SoC 100, such as I/O block 103, power management unit 104, analog/mixed-signal block 105, and clock management unit 106. In various embodiments, SoC 100 may be configured for use in a mobile computing application such as, e.g., a tablet computer or smartphone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores and may include one or more register files and memories.

In various embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM), for example. Some embodiments may include a single memory, such as memory block 102 and other embodiments may include more than two memory blocks (not shown). In some embodiments, memory block 102 may be configured to store program instructions that may be executed by processor 101. Memory block 102 may, in other embodiments, be configured to store data to be processed, such as graphics data, for example.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 103 may be configured to implement a version of Universal Serial Bus (USB) protocol, or IEEE 1394 (Firewire®) protocol, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from external to SoC 100, coupled through power supply pins. Power management unit 104 may include one or more voltage regulators to adjust outputs of the power supplies to various voltage levels as required by functional blocks within SoC 100.

Analog/mixed-signal block 105 may include a variety of circuits including, for example, a crystal oscillator, a phase-locked loop (PLL) or frequency-locked loop (FLL), an analog-to-digital converter (ADC), and a digital-to-analog converter (DAC) (all not shown). In some embodiments, analog/mixed-signal block 105 may also include radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to enable, configure and manage outputs of one or more clock sources, such as, for example clock generator 107. In various embodiments, the clock sources may be located in analog/mixed-signal block 105, in clock management unit 106, in other blocks with SoC 100, or come from external to SoC 100, coupled through one or more I/O pins. In some embodiments, clock management 106 may be capable of dividing a selected clock source before it is distributed throughout SoC 100. Clock management unit 106 may include registers for selecting an output frequency of a PLL, FLL, or other type of adjustable clock source. Clock management unit 106 may be capable of selecting a clock source for a given clock signal to be distributed to one or more other functional blocks in SoC 100.

Clock generator 107 may be a sub-module of analog/mixed signal block 105 or clock management unit 106. In other embodiments, clock generator 107 may be a separate module within SoC 100. One or more clock sources may be included in clock generator 107. In some embodiments, clock generator 107 may include PLLs, FLLs, internal oscillators, oscillator circuits for external crystals, etc. One or more clock signal outputs 112 may provide clock signals to various functional blocks of SoC 100.

System bus 110 may be configured as one or more buses to couple processor 101 to the other functional blocks within the SoC 100 such as, e.g., memory block 102, and I/O block 103. In some embodiments, system bus 110 may include interfaces coupled to one or more of the functional blocks that allow a particular functional block to communicate through the bus. In some embodiments, system bus 110 may allow movement of data and transactions (i.e., requests and responses) between functional blocks without intervention from processor 101. For example, data received through the I/O block 103 may be stored directly to memory block 102.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies.

Clock Domains within an SoC

Figure 2:
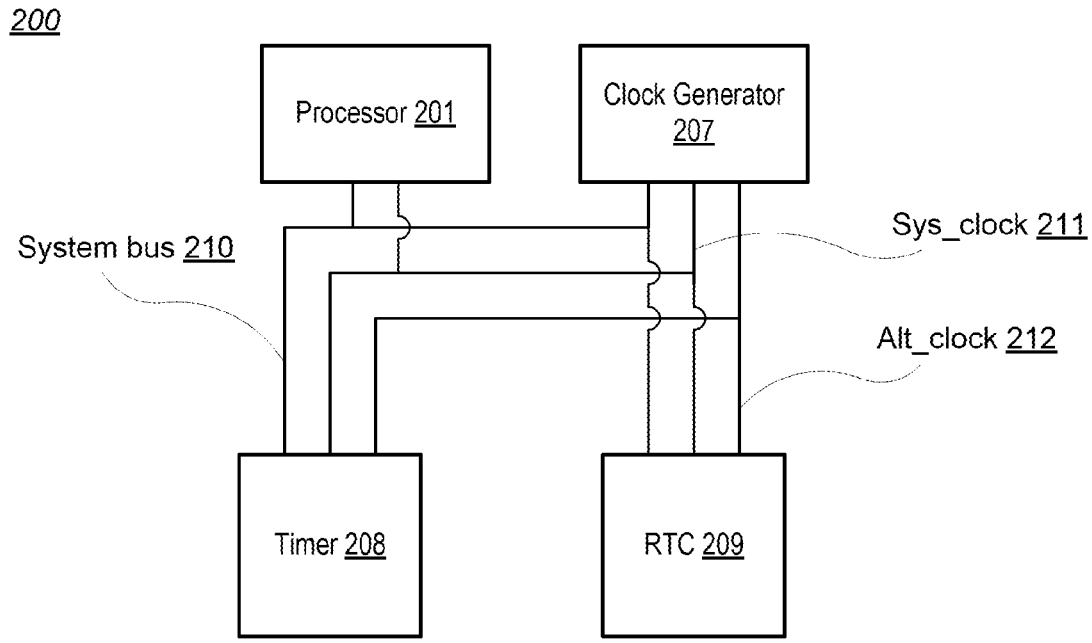
FIG. 2 illustrates a block diagram of an embodiment of a clocking scheme for functional blocks of an SoC.

Turning to FIG. 2, an embodiment of a block diagram of clocking scheme for functional blocks of an SoC is illustrated. System 200 may represent a portion of an SoC, such as SoC 100, for example, and may include processor 201 coupled to clock generator 207, timer 208 and real-time clock (RTC) 209 through system bus 210. Clock generator 207 may generate clock signals sys_clock 211 and alt_clock 212.

Processor 201 may correspond to processor 101 in FIG. 1 and, therefore, function as previously described. In addition, processor 201 may utilize timer 208 and RTC 209 to measure a time period or track a time of day. Communication between processor 201, timer 208 and RTC 209 may occur through system bus 210, which, in some embodiments, may correspond to system bus 110 in FIG. 1. Communication via system bus 210 may occur at a data rate based on sys_clock 211 generated by clock generator 207.

Clock generator 207 may provide a clock signal usable by processor 201, timer 208 and RTC 209, and, in some embodiments, by other functional blocks not illustrated in FIG. 2. In various embodiments, clock generator 207 may output a single clock signal from a single clock source, or, as illustrated, may provide multiple clock signals generated from various clock sources. For example, clock generator 207 may include any combination of PLLs, DLLs, FLLs, internal oscillators, or crystal oscillators. In the illustrated embodiment, clock generator 207 may generate sys_clock 211 and alt_clock 212, which may be generated from different clock sources and, therefore, asynchronous to each other. Sys_clock 211 may be generated from a PLL and may have a frequency in the range of 100's of MHz up to a couple of GHz. Alt_clock 212 may be generated from a crystal oscillator and may, in some embodiments, have a frequency in the 10's of kHz to 100's of kHz range.

Timer 208 may include a free-running counter to measure a time period. Timer 208 may also include registers and circuitry for performing various time related tasks such as capturing a counter value in response to a trigger or generating an interrupt after a predefined amount of time. In various embodiments, the free-running counter may use any suitable clock source to increment (or decrement in other embodiments) the counter value. In the illustrated embodiment of FIG. 2, alt_clock 212 may be the clock signal input to the counter. The other registers and circuitry in timer 208 may use sys_clock 211 in order to be synchronous to system bus 210 to allow a processor such as processor 201 to read and write the appropriate registers. Clock synchronizing circuits may be used in timer 208 for signals being used by circuits in the sys_clock 211 clock domain and the alt_clock 212 clock domain.

It is noted that a "clock domain" may refer to logic circuits clocked by a common clock signal. Circuits clocked by a different clock signal that is asynchronous to the common clock signal may be considered to be in a different clock domain. A signal generated in a first clock domain may be used in a second clock domain (referred to herein as "crossing a clock domain") and may require synchronizing to be used in the second clock domain. Clock synchronizing may refer to delaying transitions of the signal crossing clock domains to occur synchronously with the clock source for the second clock domain. This synchronizing may prevent the signal crossing clock domains from transitioning at a time which could cause circuits in the second clock domain to read a wrong value of the signal.

RTC 209 may include one or more counters which may be used to track time. In some embodiments, RTC 209 may include a single counter which may increment every second or fraction thereof. In other embodiments, several counters may be used such that one counter increments each second, another increments each minute, and another each hour. Some embodiments may include counters for days, weeks, months, and so forth. Time tracking, or time keeping, may not require a high frequency clock, but may require a high accuracy clock source for keeping accurate time over weeks, months or years of use. In such an embodiment, alt_clock 212 may provide an accurate cock signal to the counters of RTC 209 and may have a frequency that is lower than a frequency of sys_clock 211. Processor 201 may need to read a current time value from RTC 209. RTC 209 may, therefore, include circuits in the sys_clock 211 clock domain and may also require synchronization circuits to operate control signals to read current values of the one or more counters to return a current time value to the processor 201.

It is noted that the embodiment of system 200 as illustrated in FIG. 2 is merely an example. The illustration of FIG. 2 has been simplified to highlight features relevant to this disclosure. In other embodiments, additional functional blocks such as memories and analog/mixed signal functions may be included. Timer and RTC modules are used solely as example functional blocks. Various embodiments may include any number and types of functional blocks.

As used herein, "synchronous" or "synchronizing" may refer to a timing relationship between transitions of two or more signals. A plurality of signals may be considered synchronous if transitions of the signals occur responsive to a common event, such as, for example, a falling edge of a shared clock signal. Due to process variations and gate delays through digital circuits, synchronous signals may not all transition at an exact same point in time, yet may still be considered synchronous if their transitions occur within a consistent time of one another. Asynchronous signals may not share a common clock signal or other event to establish synchronicity. Asynchronous signals may, therefore, transition seemingly at random to each other. In other words, asynchronous signals may lack a common point of reference for timing of signal transitions.

It is also noted that a "clock transition," as referred to herein (which may also be referred to as a clock edge in some embodiments) may refer to a clock signal changing from a first logic value to a second logic value. A clock transition may be "rising" if the clock signal goes from a logic 0 value to a logic 1 value, and "falling" if the clock signal goes from a logic 1 to a logic 0.

Figure 3:
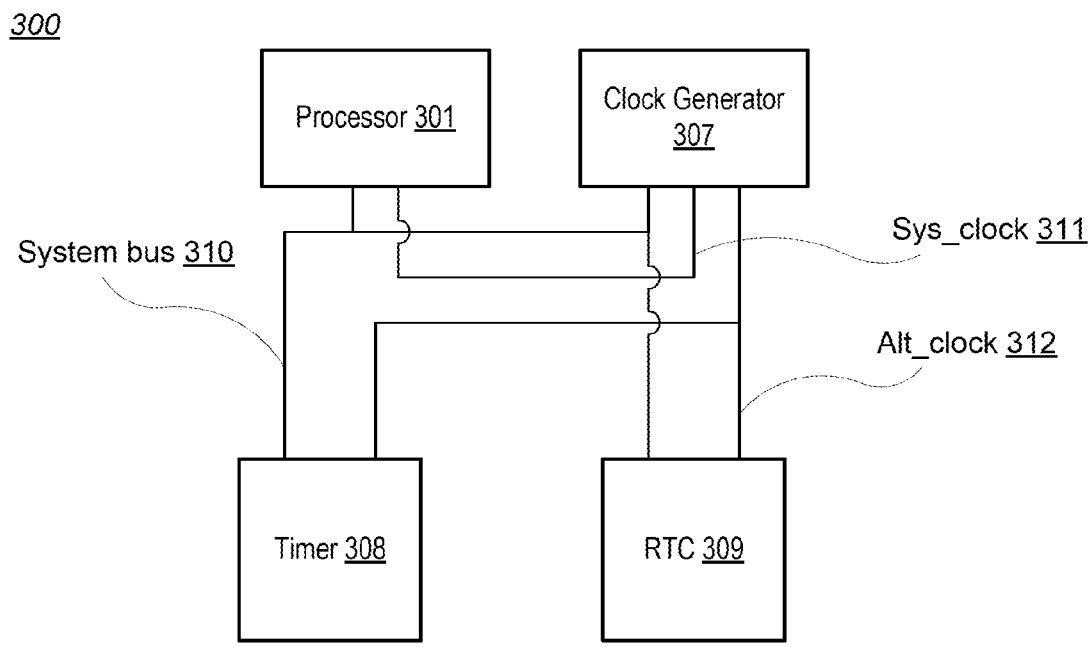
FIG. 3 illustrates a block diagram of another embodiment of a clocking scheme for functional blocks of an SoC.

Moving to FIG. 3, a block diagram of another embodiment of a clocking scheme for functional blocks of an SoC is presented. System 300 may also represent a portion of an SoC, such as SoC 100, for example. System 300 may include similar functional blocks to system 200 in FIG. 2, such as processor 301 coupled to clock generator 307, timer 308 and real-time clock (RTC) 309, all communicable via system bus 310. Clock generator 307 may generate clock signals sys_clock 311 and alt_clock 312. Components of system 300 may function as per the description of the similar component of system 200 as detailed above, unless stated otherwise below.

In system 300, in contrast to system 200, sys_clock 311 may not be provided to timer 308 or RTC 309. Alt_clock 312 may include differences when compared to alt_clock 212 of FIG. 2. Alt_clock 312 may be generated from a combination of sys_clock 311 and a crystal oscillator such as may be the clock source for alt_clock 212. Clock generator 307 may generate alt_clock 312 by selecting clock pulses from sys_clock 311 or clock pulses from the crystal oscillator (or other suitable clock source in various embodiments) depending on a state of a clock selection input to clock generator 307. By generating alt_clock 312 as a combination of sys_clock 311 and the crystal oscillator, system 300 may be able to send a single clock signal to components such as timer 308 and RTC 309.

It is noted that a "clock pulse" or a "signal pulse," as used herein, may refer to two consecutive transitions of a logic signal, such as a clock signal. For example, a rising transition followed by a falling transition may correspond to a high clock pulse or rising clock pulse, while a falling transition followed by a rising transition may constitute a low clock pulse or falling clock pulse.

Timer 308 may, like timer 208, include a free-running counter to measure a time period. When incrementing this counter and not interfacing with another functional block through system bus 310, timer 308 may require only the crystal oscillator output as an input clock signal. When interfacing via system bus 310 to other components, timer 308 may then need sys_clock 311, or may just need some clock pulses of sys_clock 311 to synchronize with system bus 310. RTC 309 may, similarly, alternate between requiring only the crystal oscillator output and requiring clock pulses synchronized to sys_clock 311.

It is noted that FIG. 3 is merely an example of a clocking scheme in an SoC. The illustrated embodiment is simplified for purposes of demonstrating the concepts of the synchronization circuit. Various other embodiments may have more or fewer components and may be configured differently. For example, although a crystal oscillator is used as an example of an alternate clock source to sys_clock 311, any suitable clock source may be used in various embodiments.

Figure 4:
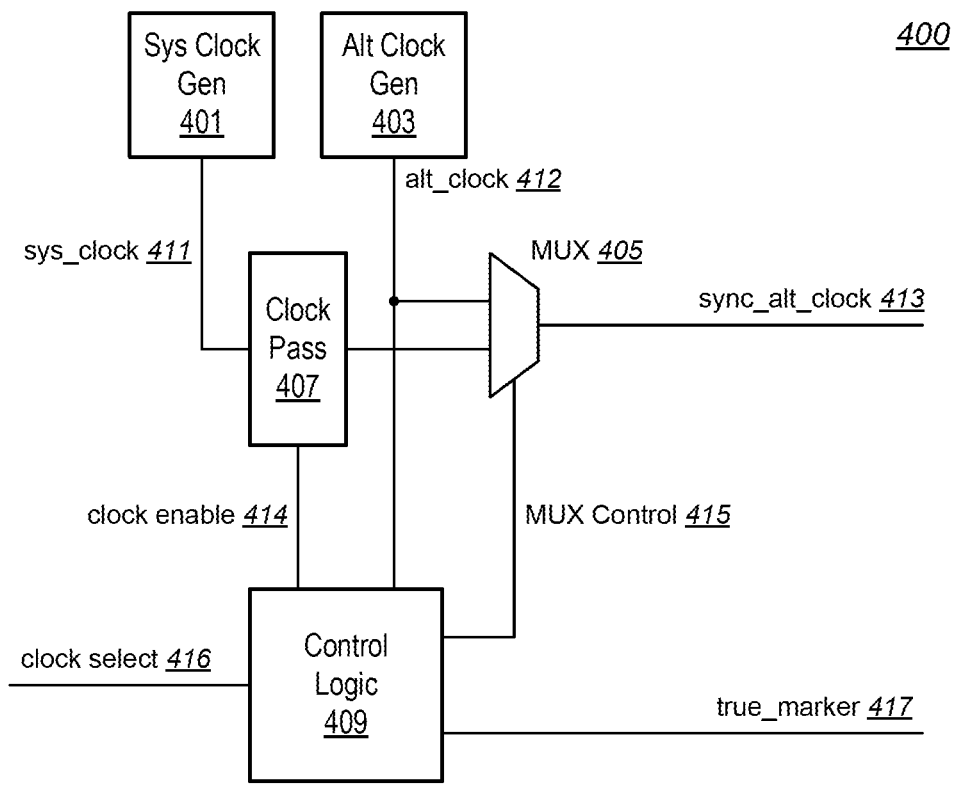
FIG. 4 illustrates a block diagram of an embodiment of a clock synchronization system.

Turning now to FIG. 4, a block diagram of an embodiment of a clock synchronization system is illustrated. Synchronization system 400 may correspond to a clock synchronization system used in a clock generator, such as, for example, clock generator 307 in 300 of FIG. 3, to synchronize two clock signals for use in functional blocks required to operate within two clock domains. Synchronization system 400 may include system clock generator (sys clock gen) 401 coupled to multiplexor unit (MUX) 405 through clock pass circuit 407 and alternate clock generator (alt clock gen) 403 coupled to MUX 405. Synchronization system 400 may also include control logic 409 coupled to alt clock gen 403, clock pass circuit 407, and MUX 405.

Sys clock gen 401 may generate a system clock signal, sys_clock 411, for use by a system bus such as system bus 310 in FIG. 3. Sys_clock 411 may correspond to sys_clock 311 in FIG. 3. Sys_clock gen 401 may correspond to a PLL, FLL, DLL or any suitable clock source for system bus 310.

Alt clock gen 403 may generate an alternate clock signal, alt_clock 412, for use by components in an SoC, such as SoC 100 in FIG. 1. Alt_clock 412 may correspond to alt_clock 212 in FIG. 2. Alt_clock 412 may provide a time base for use in functional blocks such as timer 308 and RTC 309 in FIG. 3.

MUX 405 may receive sys_clock 411 and alt_clock 412 as input signals and select one of them as an output depending on a state of MUX control 415 from control logic 415. The selected signal that may be output from MUX 405 may be sync_alt_clock 413 and may correspond to alt_clock 312 in FIG. 3.

It is noted that a multiplexing circuit (also referred to as a "multiplexor" or "mux") is a circuit used to select one of two or more input signals to use as an output signal. The multiplexor shown herein, MUX 405, may be implemented with two inputs and a single output, wherein the output signal is chosen by a single control input signal. For example, alt_clock 412 may be selected as the output of MUX 405 if MUX control 415 is asserted and sys_clock 411 may be selected if MUX control 415 is de-asserted.

Control logic 409 may include various circuits for controlling the selection of sys_clock 411 or alt_clock 412 as output signal sync_alt_clock 413 by changing a value of MUX control 415. Control logic 409 may receive inputs on clock select 416 from one or more functional blocks to indicate which clock signal should be selected for sync_alt_clock 413. In addition, control logic 409 may receive alt_clock 412 from alt_clock gen 403. Alt_clock 412 may be used by control logic 409 to synchronize changes in the selection of the clock source for sync_alt_clock 413. For example, control logic 409 may only change a value of MUX control 415 when alt_clock 412 is low or in response to a falling transition on alt_clock 412.

Control logic 409 may control clock pass circuit 407 by generating values for clock enable 414. Clock pass circuit 407 may allow one or more clock pulses of sys_clock 411 to pass through to MUX 405. In some embodiments, clock pass circuit 407 and control logic 409 may operate in unison to allow only selected clock pulses of sys_clock 411 to pass through. For example, control logic 409 may operate clock pass circuit 407 to allow only one clock pulse of sys_clock 411 to pass for a rising transition on alt_clock 412. In such an embodiment, even though sys_clock 411 may be selected for generating sync_alt_clock 413, sync_alt_clock 413 may still have a frequency similar to alt_clock 412, and functional blocks such as timer 308 and RTC 309 may use sync_alt_clock 413 to increment their respective counters at a same rate as alt_clock 412. Since clock pulses of sys_clock 411 are used, however, transitions of sync_alt_clock 413 may be synchronized with corresponding transitions of sys_clock 411.

As previously discussed, functional blocks, such as timer 308 and RTC 309, may be accessed by another component, such as processor 301, operating in the sys_clock 411 clock domain. For example, processor 301 may access RTC 309 to read a current time value. Circuitry in RTC 309 may need to operate in the sys_clock 411 clock domain, at least temporarily, to interact with processor 301 via system bus 310. In such circumstances, processor 301 or RTC 309 may send an indication to control logic 409 that a temporary "burst" of sys_clock 411 clock pulses are required. In response, control logic 409 may use clock pass circuit 407 to allow all clock pulses of sys_clock 411 to pass until receiving another indication to end the burst of clock pulses. Control logic 409 may then return to the previous condition of using clock pass circuit 407 to pass a single sys_clock 411 clock pulse for each rising transition of alt_clock 412.

In this example, the counters of RTC 309 and timer 308 may be receiving the same sync_alt_clock 413 with the additional sys_clock 411 clock pulses. The counter and timer 308, however, may still be expecting a clock signal with a frequency similar to alt_clock 412, which may not be true when the additional clock pulses of sys_clock 411 are added to sync_alt_clock 413. To compensate, control logic 409 may generate another signal, true_marker 417, which may be asserted for each sync_alt_clock 413 clock pulse that corresponds to a rising transition on alt_clock 412 and is de-asserted for the other additional burst of sync_alt_clock 413 clock pulses. Circuits in RTC 309 and timer 308 or any other component using sync_alt_clock 413 in place of alt_clock 412 may use true_marker 417 in conjunction with sync_alt_clock 413 to identify only clock pulses that align with alt_clock 412.

It is noted that FIG. 4 is merely an example for demonstration purposes. In other embodiments, circuits may be configured differently. Various other embodiments may include a different number of functional blocks. For example, control logic 409 is described as using clock pass circuit 407 to pass a single sys_clock 411 clock pulse for each rising transition of alt_clock 412. Other embodiments are contemplated in which control logic 409 may use clock pass circuit 407 to pass a single sys_clock 411 clock pulse for each falling transition of alt_clock 412 or for each rising and falling transition of alt_clock 412.

Figure 5:
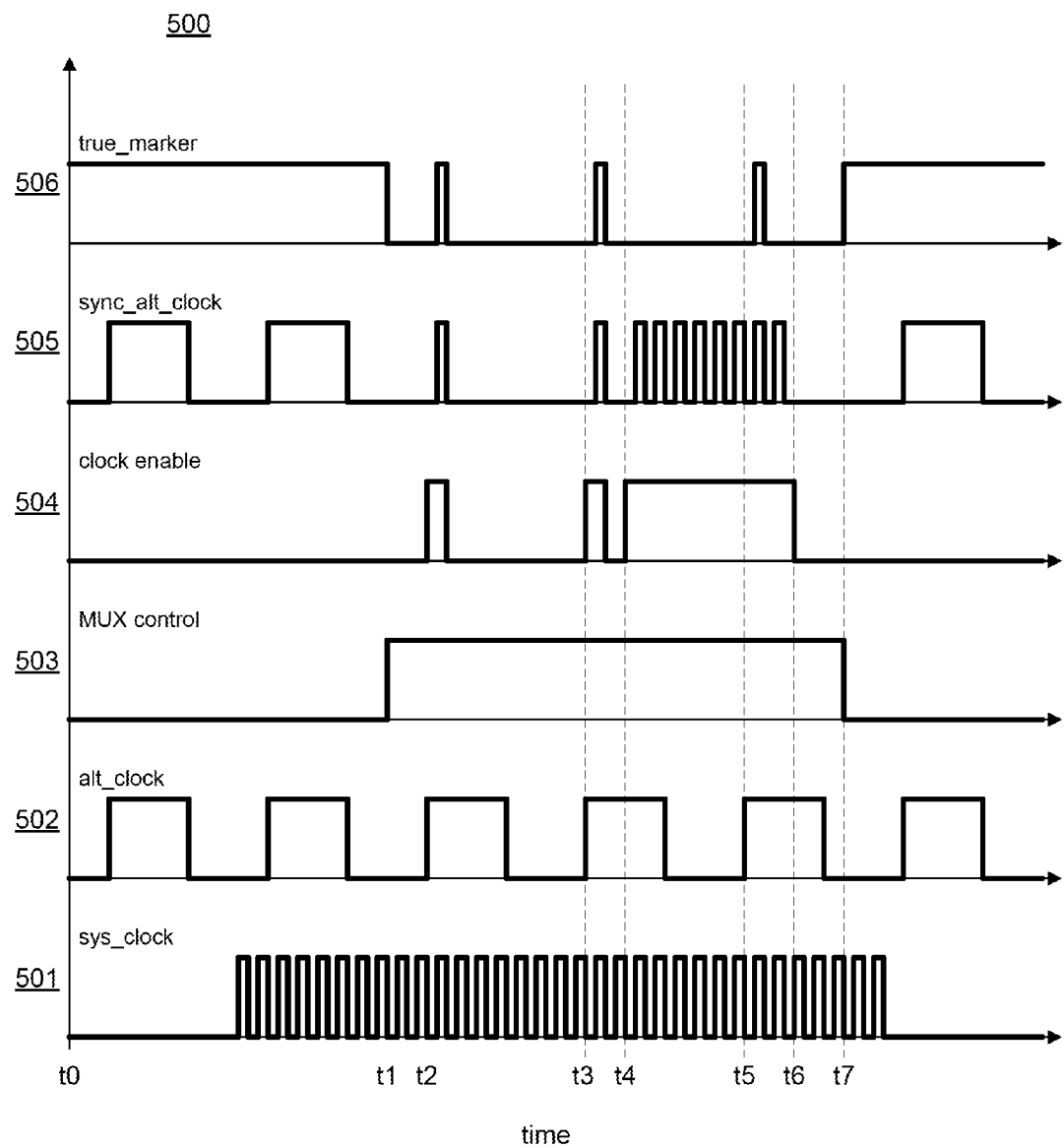
FIG. 5 illustrates a chart of possible waveforms of an embodiment of a synchronization system.

Moving now to FIG. 5, a chart of possible waveforms of an embodiment of a synchronization system is illustrated. The waveforms of chart 500 may correspond to operations of synchronization system 400 in FIG. 4 and may illustrate logic levels of signals versus time. Chart 500 includes possible examples of waveforms for sys_clock 501, alt_clock 502, MUX control 503, clock enable 504, sync_alt_clock 505, and true_marker 506. Each of these waveforms may correspond to a similarly named signal in FIG. 4. Referring collectively to synchronization system 400 of FIG. 4 and chart 500 of FIG. 5, the waveforms may begin at time t0.

At time t0, sys_clock 501 may be disabled, as part of a power reduction mode for example, and alt_clock 502 may be active and running MUX control 503 may be low, which may result in MUX 405 selecting alt_clock 502 as the output clock signal, sync_alt_clock 505. Since sys_clock 501 is inactive within synchronization system 400 at time t0, clock enable 504 may remain low to prevent sys_clock 501 from passing to the input of MUX 405, in particular when sys_clock 501 is enabled and may experience clock glitches as it returns to active operation. While alt_clock 502 is selected as sync_alt_clock 505, true_marker 506 may remain high.

At time t1, MUX control 503 may transition high, resulting in MUX 405 selecting sys_clock 501 as sync_alt_clock 505. The transition of MUX control 503 may be in response to an indication from a functional block such as, for example, processor 301, timer 308 or RTC 309 from FIG. 3. Control logic 409 may transition MUX control 503 responsive to a falling transition of alt_clock 502 or at another time when MUX 405 may switch clock sources without causing a clock glitch on sync_alt_clock 505. Clock enable 504 may remain low until a rising transition occurs on alt_clock 502. True_marker 506 may transition low in response to MUX control 503 transitioning high. True_marker 506 may remain low until a clock pulse of sys_clock 501 occurs relative to a rising transition of alt_clock 502.

A rising transition of alt_clock 502 may occur at time t2. In response to the rising transition of alt_clock 502, clock enable 504 may transition high to allow a next clock pulse of sys_clock 501 to pass. It is noted that sys_clock 501 and alt_clock 502 may not be synchronized, so a delay may be observed between the rising transition of alt_clock 502 and the subsequent rising transition of sys_clock 501. A single clock pulse of sys_clock 501 may be passed by clock pass circuit 407 to sync_alt_clock 505. True_marker 506 may include a high pulse corresponding to clock pulse passed to sync_alt_clock 505 to indicate that this particular clock pulse on sync_alt_clock 505 corresponds to a rising transition of alt_clock 502. A subsequent rising transition of alt_clock 502 may occur at time t3. Clock enable 504, sync_alt_clock 505 and true_marker 506 may respond as they did at time t2.

At time t4, control logic 409 may receive an indication that one or more functional blocks require additional pulses of sys_clock 501. The indication may be in response to a functional block, such as timer 308 being accessed by processor 301 and timer 308 requiring the additional clock pulses to interact with processor 301. In response to the indication, control logic 409 may assert clock enable 504. A number of sys_clock 501 clock pulses may be allowed to pass on to sync_alt_clock 505, such that two or more sys_clock 501 clock pulses may pass onto sync_alt_clock 505 within one period of alt_clock 502, e.g., between time t3 and time t5. The additional sys_clock 501 clock pulses may continue to pass until control logic 409 receives an indication that the additional sys_clock 501 clock pulses are no longer required. True_marker 506 may remain low during clock pulses on sync_alt_clock 505 that do not relate to a rising transition of alt_clock 502. At time t5, a rising transition on alt_clock 502 may result in true_marker 506 asserting high for a corresponding clock pulse of sync_alt_clock 505 related to the rising transition on alt_clock 502.

Control logic 409 may receive, at time t6, an indication that the additional sys_clock 501 clock pulses are no longer required. Clock enable 504 may transition low in response and the additional clock pulses of sys_clock 501 may not be passed on to sync_alt_clock 505.

At time t7, MUX control 503 may transition low in response to a signal received by control logic 409 to switch back to alt_clock 502 as the source for sync_alt_clock 505. Clock enable 504 may remain low while MUX control 503 is low and true_marker 506 may remain high. Pulses of alt_clock 502 may be passed on to sync_alt_clock 505 as they occur. In some embodiments, sys_clock 501 may be disabled in response to the switch to alt_clock 502.

It is noted that chart 500 of FIG. 5 merely illustrates examples of waveforms that may result from the example embodiments as presented in this disclosure. The waveforms are simplified to provide clear descriptions of the disclosed concepts. In other embodiments, the waveforms may appear different due various influences such as technology choices for building the circuits, actual circuit design and layout, ambient noise in the environment, choice of power supplies, etc.

Methods for Synchronizing Signals Across Clock Domains

Figure 6:
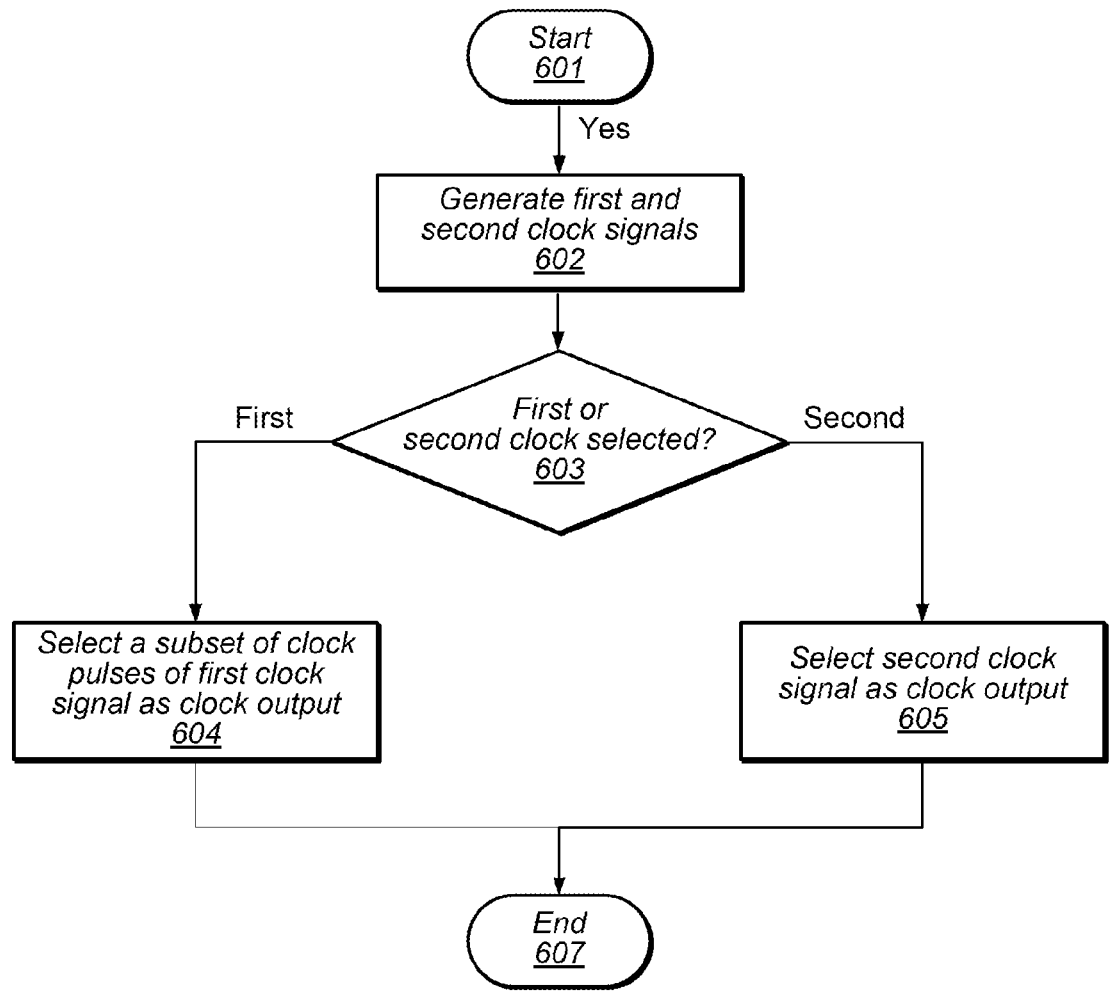
FIG. 6 illustrates a flowchart of an embodiment of a method for selecting a clock source.

Turning to FIG. 6, a flowchart of an embodiment of a method for selecting a clock source is illustrated. The method may be applied to a synchronization system, such as, for example, synchronization system 400 in FIG. 4. Referring collectively to system 300 in FIG. 3, synchronization system 400 in FIG. 4 and the flowchart in FIG. 6, the method may begin in block 601.

First and second clock signals may be generated (block 602). One or more clock generation circuits, such as, e.g., clock generation circuit 307, may generate at least two clock signals. A frequency of the second clock signal may be slower than a frequency of the first clock signal. The first and second clock signals may be generated independently of each other and may, therefore, be asynchronous to each other.

The method may depend on a selection between the first and second clock signals (block 603). In some embodiments, the first clock signal may be disabled or blocked for reasons such as power savings or reductions in switching noise. In such cases, the second clock signal may be selected as a clock source to one or more functional blocks, such as, for example, RTC 309 or timer 308. The first clock signal may be selected at other times when the first clock signal is active. Other scenarios for selecting between the first and second clock signals are known and contemplated. If the first clock signal is selected, then the method may move to block 604 to select the first clock signal. Otherwise, the method may move to block 605 to select the second clock signal.

If the first clock signal is selected, then a subset of clock pulses of the first clock signal may be passed on to a clock output signal (block 604). Synchronization system 400 may be designed to create a clock signal that is synchronized to the first clock signal yet has a frequency equivalent to the second clock signal. The first clock signal may be selected as the source for the clock output signal to achieve synchronization. If clock pulses of the first clock signal are used as the clock output signal, then the clock output signal will naturally be synchronized to the first clock signal. To achieve a frequency equivalent to the second clock signal, only a subset of clock pulses of the first clock signal may be allowed to pass onto the clock output signal. For example, a circuit, such as control logic 409, may pass one clock pulse of the first clock signal for every rising transition of the second clock signal. In other embodiments, control logic 409 may pass one clock pulse of the first clock signal for each falling transition of the second clock signal. In further embodiments, a clock pulse of the first clock signal may be passed for each rising and falling transition of the second clock signal, in effect doubling the frequency of the second clock source which may be desirable in such embodiments.

If the second clock signal is selected in block 603, then all clock pulses of the second clock signal may be passed on to the clock output signal (block 605). If the first clock signal is currently unavailable or if synchronicity between the first and second clock signals is not currently required, then the second clock signal may be selected as the clock output signal. For example, a functional block such as timer 308 or RTC 309 may be left enabled while other portions of an SoC, such as SoC 100 in FIG. 1, are placed into a reduced power mode. As part of the reduced power mode, the first clock signal may be disabled as part of the power reduction. Since the first clock signal is disabled, synchronicity of the second clock signal to the first may not be required. RTC 309 may be left enabled in the reduced power mode so that it may continue to track time. In some embodiments, RTC 309 may be configured to generate an interrupt to processor 301 at a predetermined time to wake up processor 301 and the remainder of SoC 100 from the reduced power mode. The method may end in block 607.

It is noted that the method illustrated in FIG. 6 is merely an example embodiment. Variations on this method are possible. Some operations may be performed in a different sequence, and/or additional operations may be included.

Figure 7:
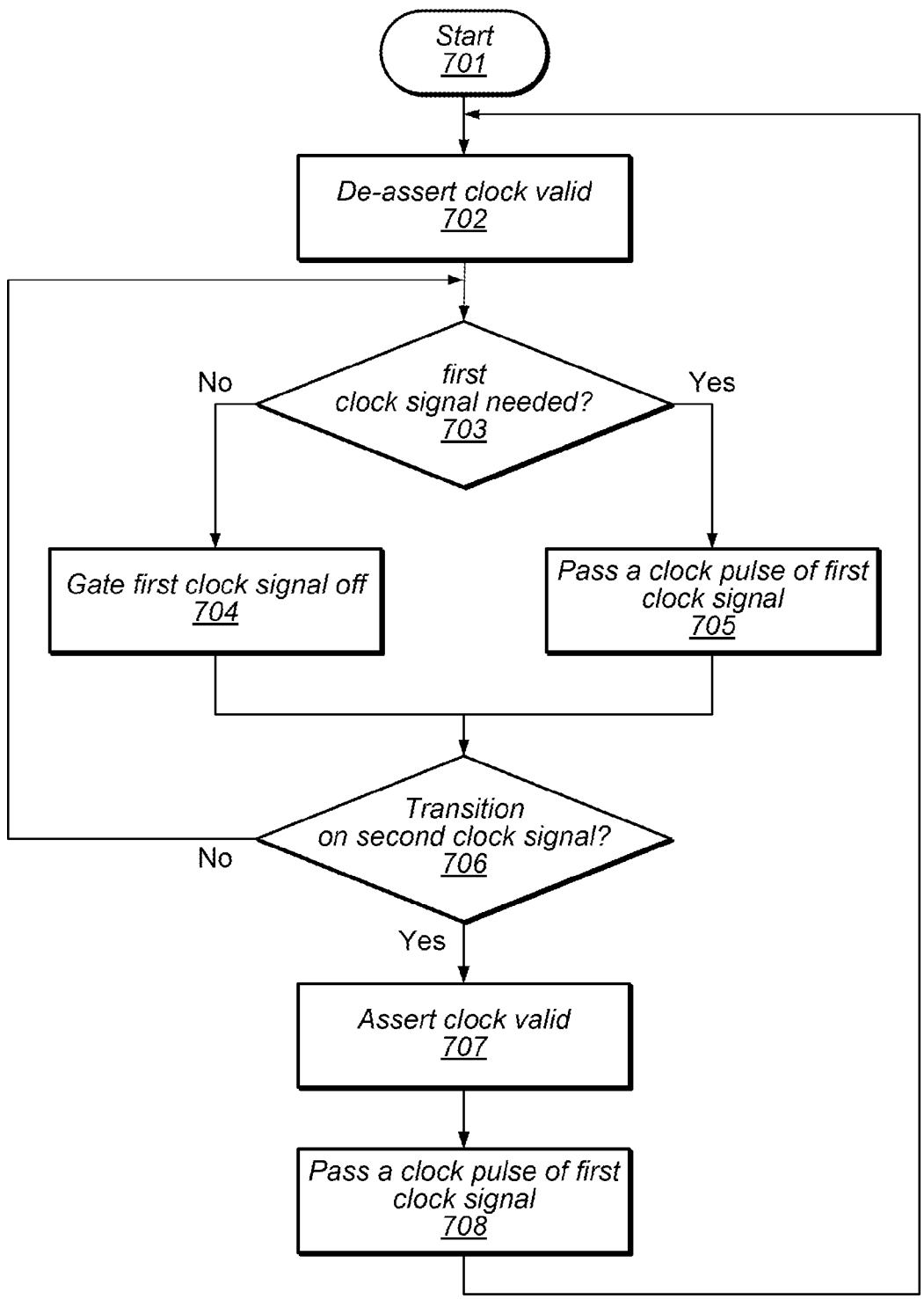
FIG. 7 illustrates a flowchart of an embodiment of a method for synchronizing two clock signals.

Moving now to FIG. 7, a method is illustrated for synchronizing two clock signals. The method may be applied to a synchronizing circuit such as, for example, synchronization system 400 in FIG. 4 used in a system such as system 300 in FIG. 3. The method may correspond to actions performed in block 604 of the method of FIG. 6. Referring collectively to FIG. 3, FIG. 4 and the flowcharts in FIG. 6 and FIG. 7, the method may begin in block 701 with the first clock signal described in relation to FIG. 6 having been selected as a clock output signal.

A clock valid signal, such as true_marker 417 for example, may be de-asserted (block 702). Circuitry, such as control logic 409 may determine the value of the clock valid signal. The clock valid signal may have already been de-asserted and may remain de-asserted at this point or it may have previously been asserted and may now be de-asserted. In some embodiments, de-asserting a signal may refer to driving a low value on the signal.

The method may depend on a need for the first clock signal (block 703). A functional block in system 300 may indicate that the first clock signal is needed. For example, processor 301 may need to write a value to a register in timer 308, requiring one or more clock pulses of the first clock signal in timer 308 to complete the interaction. If the first clock signal is not required at this time, then the method may move down to block 704 to gate the first clock signal. Otherwise, the method may move to block 705 to enable the first clock signal.

If the first clock signal is not needed at the current time, then the first clock signal may be gated off (block 704). As used herein, "gated off" may refer to preventing transitions of a signal, such as the first clock signal, from propagating beyond a designated circuit, sometimes implemented as a logic AND gate, NOR gate, or other appropriate logic gate, although any suitable circuit capable of preventing a signal propagation is contemplated. The first clock signal may be gated off until either a clock pulse of the first clock signal is requested or a corresponding transition of the second clock signal (as described in relation to FIG. 6) occurs.

If the first clock signal is needed, then a next clock pulse of the first clock signal may be passed on to the clock output signal (block 705). If not previously asserted, then control circuitry 409 may assert a clock enable signal, such as, for example, clock enable 414. A given clock pulse of the first clock signal may include both a rising transition and a falling transition. An assertion of the clock enable signal may allow clock pass circuit 407 to pass a clock pulse from the first clock signal through MUX 405 and on to the clock output signal, where it may be received, for example, in timer 308.

The method may now depend on detecting a transition on the second clock signal (block 706). The clock valid signal may depend on detecting an active transition on the second clock signal. The clock enable signal, if not asserted in block 705, may also depend on detecting an active transition on the second clock signal. In some embodiments, a rising transition may be the active transition, while in other embodiments, a falling transition may be the active transition. Certain embodiments may use both rising and falling transitions as active transitions. If an active transition is detected, then the method may move to block 707 to assert the clock valid signal. Otherwise, the method may return to block 703 to determine again the first clock signal is needed.

If an active transition is detected, then the clock valid signal may be asserted (block 707). By asserting the clock valid signal, circuits receiving the clock output signal may be able to discern if a received clock pulse is related to an active transition of the second clock signal. Some circuits may be intended to react to clock pulses related to an active transition of the second clock pulse, such as, for example, a counter in either RTC 309 or timer 308, whereas, other circuits within these components may be intended to react with all clock pulses on the clock output signal, such as register interfaces for example.

A clock pulse of the first clock signal may be passed to the clock output signal (block 708). If the clock enable signal was previously asserted in response to the first clock signal being needed, then the clock enable signal may remain asserted. If not, then the clock enable signal may be asserted now to allow a clock pulse of the first clock signal, related to the transition of the second clock signal, to be passed to the clock output signal. The method may return to block 702 to de-assert the clock valid signal after the related clock pulse has passed to the clock output signal. The method may continue until the first clock signal is no longer selected as the source for the clock output signal.

It is noted that the method illustrated in FIG. 7 is merely an example embodiment. In other embodiments, the method may include one or more additional blocks. In some embodiments, blocks may execute in a different order and some blocks may execute in parallel.

Figure 8:
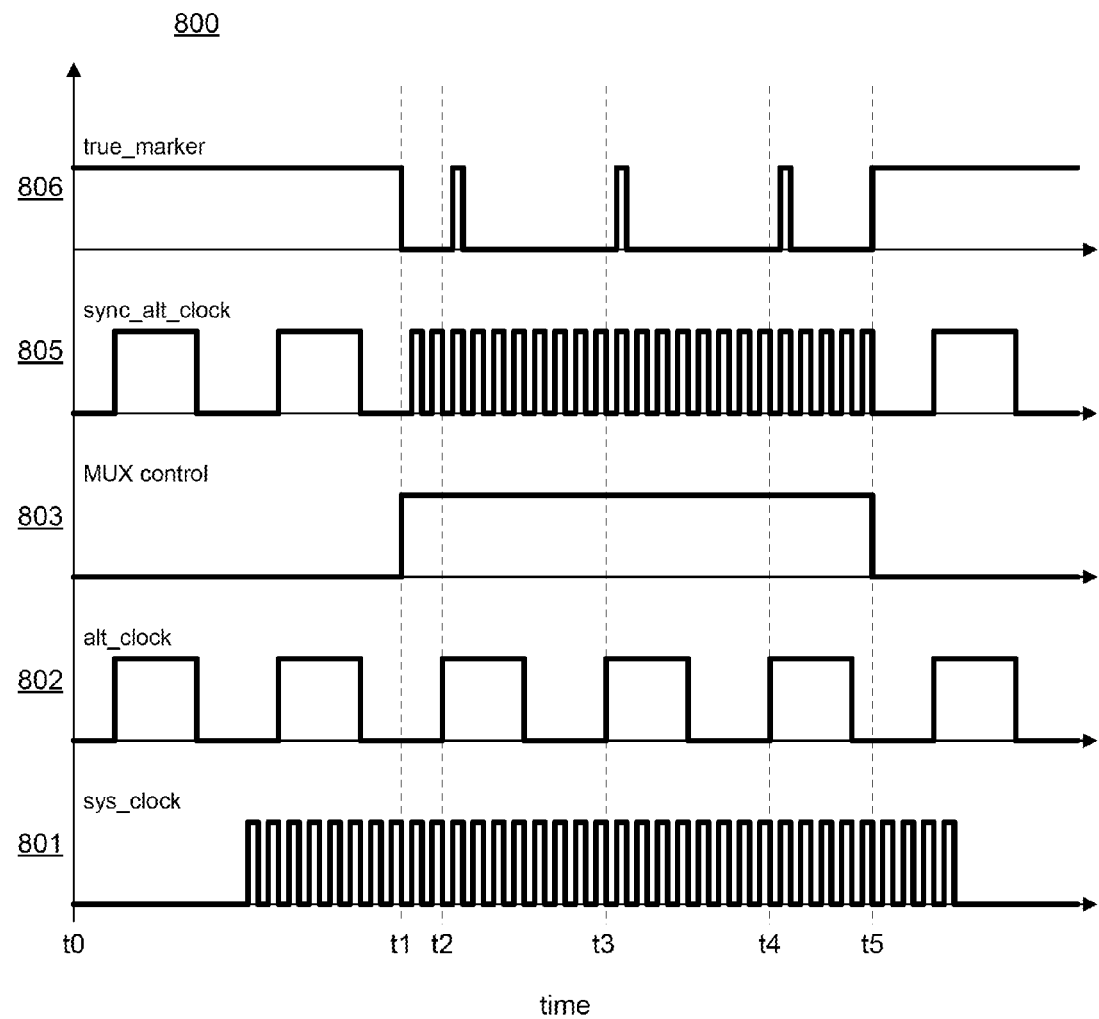
FIG. 8 illustrates a chart of possible waveforms of another embodiment of a synchronization system.

Turning now to FIG. 8, a chart of possible waveforms of another embodiment of a synchronization system is illustrated. The waveforms of chart 800 may correspond to an alternative operation of synchronization system 400 in FIG. 4 and may illustrate logic levels of signals versus time. Chart 800 includes possible examples of waveforms for sys_clock 801, alt_clock 802, MUX control 803, sync_alt_clock 805, and true_marker 806. Each of these waveforms may correspond to a similarly named signal in FIG. 4. Referring collectively to synchronization system 400 of FIG. 4 and chart 800 of FIG. 8, the waveforms may begin at time t0.

From time t0 to time t1, the waveforms of the embodiment of chart 800 may correspond to the waveforms of the embodiment of chart 500 in FIG. 5. In the previously discussed embodiments, only selected clock pulses of the system clock, such as sys_clock 501, were passed onto a clock output signal, such as sync_alt_clock 505. In the alternative embodiment proposed here in FIG. 8, clock pass circuit 407 may be controlled by the same MUX control 415 signal that controls selection of sys_clock 801 or alt_clock 802. In some embodiments, clock pass circuit 407 may be removed altogether. In the current embodiment, at time t1, all clock pulses of sys_clock 801 may be passed to sync_alt_clock 805 when MUX control 803 transitions to select sys_clock 801 as the source for sync_alt_clock 805.

At times t2, t3 and t4, true_marker 806 may assert in response to a rising transition on alt_clock 802. Some circuits coupled to sync_alt_clock 805 may need to respond to clock pulses that relate to a rising transition of alt_clock 802. For example, a counter in either timer 308 or RTC 309 may be intended to respond to rising transitions of alt_clock 802 in order to maintain a consistent increment of the counter over time. Control logic 409 may assert true_marker 806 for each clock pulse of the first clock signal related to each rising transition of the second clock pulse. MUX control 803 may transition again at time t5, which may result in alt_clock 802 being selected as the source for sync_alt_clock 805. In some embodiments, sys_clock 801 may be disabled or gated off to conserve power or to reduce switching noise.

It is noted that chart 800 of FIG. 8 is merely an example of waveforms that may result from the presented embodiments. The waveforms are simplified to provide clear descriptions of the disclosed concepts. In other embodiments, the waveforms may appear different due various influences such as technology choices for building the circuits, actual circuit design and layout, ambient noise in the environment, choice of power supplies, etc.

Figure 9:
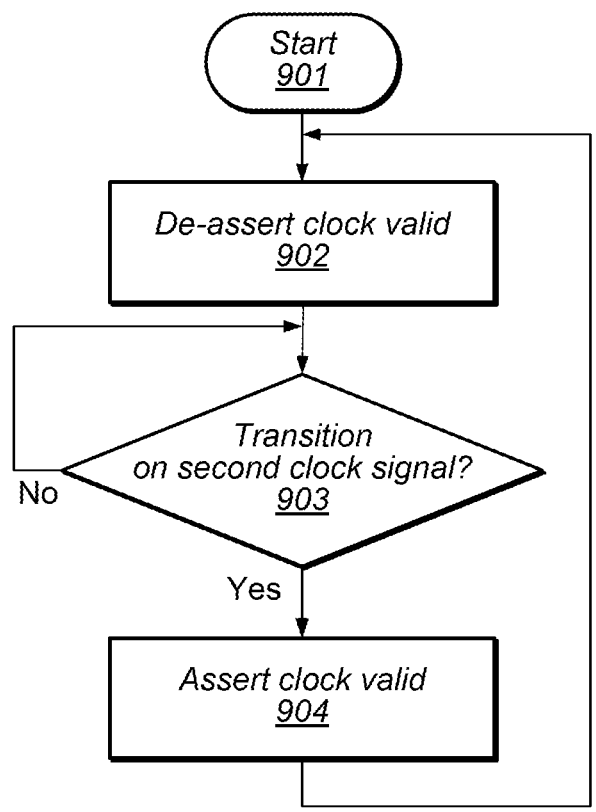
FIG. 9, illustrates a flowchart of another embodiment of a method for synchronizing two clock signals.

Moving to FIG. 9, another method is illustrated for synchronizing two clock signals. The method of FIG. 9 may correspond to the waveforms of FIG. 8. The method may be applied to a synchronizing circuit such as, for example, synchronization system 400 in FIG. 4. The method may correspond to actions performed in block 604 of the method of FIG. 6. Referring collectively to FIG. 4, FIG. 8, and the flowcharts in FIG. 6 and FIG. 9, the method may begin in block 901 with the first clock signal described in relation to FIG. 6 having been selected as a clock output signal.

A clock valid signal, such as true_marker 806 for example, may be de-asserted (block 902). Circuitry, such as control logic 409 may determine the value of the clock valid signal. The clock valid signal may have already been de-asserted and may remain de-asserted at this point or it may have previously been asserted and may now be de-asserted, such as shown at time t1 in chart 800. In some embodiments, de-asserting a signal may refer to driving a high value on the signal instead of a low value as shown in chart 800.

The method may depend on detecting a transition on the second clock signal, such as alt_clock 802 in chart 800 (block 903). The clock valid signal may depend on detecting an active transition on the second clock signal. In some embodiments, a falling transition may be the active transition, while in the illustrated embodiment of chart 800, a rising transition may be the active transition. Certain embodiments may use both rising and falling transitions as active transitions. If an active transition is detected, then the method may move to block 904 to assert the clock valid signal. Otherwise, the method may remain in block 903 to wait for an active transition.

If an active transition is detected, then the clock valid signal may be asserted (block 904). As described in regards to block 707 of FIG. 7, by asserting the clock valid signal, circuits receiving the clock output signal may be able to discern if a received clock pulse is related to an active transition of the second clock signal. Some circuits may be intended to react to clock pulses related to an active transition of the second clock pulse, such as, for example, a counter in either RTC 309 or timer 308 in FIG. 3, whereas, other circuits within these components may be intended to react with any clock pulses on the clock output signal, such as register interfaces for example. The method may return to block 902 to de-assert the clock valid signal after the related clock pulse has passed to the clock output signal. The method may continue until the first clock signal is no longer selected as the source for the clock output signal.

It is noted that the method illustrated in FIG. 9 is merely an example. In other embodiments, the method may include one or more additional blocks. In some embodiments, blocks may execute in a different order and some blocks may execute in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a selection unit configured to select a first clock signal or a second clock signal to generate an output clock signal, wherein a frequency of the first clock signal is less than a frequency of the second clock signal; and
circuitry coupled to the selection unit, wherein the circuitry is configured to:
send a first value of a control signal to the selection unit, wherein the first value causes the selection unit to select the first clock signal;
send a second value of the control signal to the selection unit, wherein the second value causes the selection unit to select a subset of clock pulses of the second clock signal as the output clock signal, wherein the subset of clock pulses of the second clock signal includes a given clock pulse, wherein the given clock pulse is selected responsive to a detection of a given transition of the first clock signal, wherein the subset of clock pulses of the second clock signal includes at least one additional clock pulse of the second clock signal, and wherein the at least one additional clock pulse of the second clock signal occurs within a clock period of the first clock signal from the occurrence of the given transition;
assert a clock valid signal responsive to a determination the given clock pulse has begun; and
de-assert the clock valid signal responsive to a determination the given clock pulse has ended.

2. The apparatus of claim 1, wherein the circuitry is further configured to assert a clock enable signal, and wherein the at least one additional clock pulse of the second clock signal is included in the subset of clock pulses of the second clock signal responsive to a determination that the clock enable signal is asserted.

3. The apparatus of claim 1, wherein the transition of the given clock pulse corresponds to a low-to-high transition of the first clock signal.

4. The apparatus of claim 1, further including a first logic circuit configured to perform a first operation dependent upon a given transition of the output clock signal responsive to determining the clock valid signal is asserted during the given transition of the output clock signal.

5. The apparatus of claim 4, further including a second logic circuit configured to perform a second operation responsive to any transition of the output clock signal.

6. The apparatus of claim 1, wherein the circuitry is further configured to block propagation of the second clock signal in response to sending the first value of the control signal.

7. A method, comprising:
generating a first clock signal and a second clock signal, wherein a frequency of the first clock signal is less than a frequency of the second clock signal;
selecting the first clock signal as an output clock signal responsive to a first value of a selection input;
selecting a subset of clock pulses of the second clock signal as the output clock signal responsive to a second value of the selection input, wherein the subset of clock pulses of the second clock signal includes a given clock pulse of the second clock signal, wherein the given clock pulse is selected responsive to a detection of a given transition of the first clock signal, wherein the subset of clock pulses of the second clock signal includes at least one additional clock pulse of the second clock signal, wherein the at least one additional clock pulse of the second clock signal occurs within a clock period of the first clock signal from the occurrence of the given transition;
asserting a clock valid signal responsive to a determination the given clock pulse has begun; and
de-asserting the clock valid signal responsive to a determination the given clock pulse has ended.

8. The method of claim 7, further comprising asserting a clock enable signal, wherein the at least one additional clock pulse of the second clock signal is included in the subset of clock pulses of the second clock signal responsive to a determination that the clock enable signal is asserted.

9. The method of claim 7, wherein the transition of the given clock pulse of the second clock signal corresponds to a low-to-high transition of the first clock signal.

10. The method of claim 7, further comprising performing, by a first logic circuit, a first operation dependent upon a given transition of the output clock signal responsive to determining the clock valid signal is asserted during the given transition of the output clock signal.

11. The method of claim 10, further comprising performing, by a second logic circuit, a second operation responsive to any transition of the output clock signal.

12. The method of claim 7, further comprising blocking propagation of the second clock signal in response to selecting the first clock signal as the output clock signal.

13. A system, comprising:
a plurality of functional units configured to perform operations responsive to transitions of respective received clock signals;
a clock generation unit configured to output a first clock signal and a second clock signal, wherein a frequency of the first clock signal is less than a frequency of the second clock signal;
a clock management unit configured to generate a clock select signal;
a synchronizing unit, coupled to the clock generation unit, wherein the synchronizing unit is configured to:

select the first clock signal as an output clock signal responsive to a first value of the clock select signal;

select a subset of clock pulses of the second clock signal as the output clock signal responsive to a second value of the clock select signal, wherein the subset of clock pulses of the second clock signal includes a given clock pulse of the second clock signal, wherein the given clock pulse is selected responsive to a detection of a given transition of the first clock signal, wherein the subset of clock pulses of the second clock signal includes at least one additional clock pulse of the second clock signal, wherein the at least one additional clock pulse of the second clock signal occurs within a clock period of the first clock signal from the occurrence of the given transition;

assert a clock valid signal responsive to a determination the given clock pulse has begun; and de-assert the clock valid signal responsive to a determination the given clock pulse has ended.

14. The system of claim 13, wherein the synchronizing unit is further configured to assert a clock enable signal, wherein the at least one additional clock pulse of the second clock signal is included in the subset of clock pulses of the second clock signal responsive to a determination that the clock enable signal is asserted.

15. The system of claim 13, wherein at least one of the plurality of functional units is further configured to perform a first operation responsive to a given transition of the output clock signal and a determination that the clock valid signal is asserted during the given transition of the output clock signal.

16. The system of claim 15, wherein the at least one of the plurality of functional units is further configured to perform a second operation responsive to any transition of the output clock signal.

17. The system of claim 13, wherein the synchronizing unit is further configured to block propagation of the second clock signal in response to selecting the first clock signal as the output clock signal.

* * * * *